United States Patent [19]

Spiers

[11] Patent Number: 5,788,003
[45] Date of Patent: Aug. 4, 1998

[54] ELECTRICALLY POWERED MOTOR VEHICLE WITH LINEAR ELECTRIC GENERATOR

[76] Inventor: Kent Spiers, 3088 Vernon Rd., Caledonia, Miss. 39740

[21] Appl. No.: 593,674

[22] Filed: Jan. 29, 1996

[51] Int. Cl.⁶ ............................................. B60K 1/00
[52] U.S. Cl. .................. 180/65.2; 180/65.4; 180/65.8; 290/1 A
[58] Field of Search ................... 180/65.1, 65.2, 180/65.3, 76, 65.4, 65.8; 290/1 R, 1 A, 2; 318/126; 310/156, 126

[56] References Cited

U.S. PATENT DOCUMENTS

| | | |
|---|---|---|
| 3,980,908 | 9/1976 | McClintock . |
| 4,019,103 | 4/1977 | Davis et al. . |
| 4,114,305 | 9/1978 | Wohlert et al. . |
| 4,350,219 | 9/1982 | Olbrich et al. . |
| 4,507,579 | 3/1985 | Turner . |
| 4,965,864 | 10/1990 | Roth et al. . |
| 5,004,061 | 4/1991 | Andruet . |
| 5,172,784 | 12/1992 | Varela, Jr. .......................... 180/65.4 |
| 5,180,939 | 1/1993 | Rosswurm . |
| 5,343,971 | 9/1994 | Heidelberg et al. . |
| 5,343,974 | 9/1994 | Rabek . |
| 5,347,186 | 9/1994 | Konotchick . |
| 5,460,234 | 10/1995 | Matsuura et al. . |

*Primary Examiner*—Richard M. Camby
*Attorney, Agent, or Firm*—Liniak & Berenato, LLC

[57] ABSTRACT

An electrically powered vehicle is disclosed which includes at least one wheel assembly, an axle assembly, a linearly reciprocating piston member, and an internal combustion engine for causing linear movement of the piston member for generating electric power. Electric power generated by the linear reciprocating motion of the piston including a coil within an annular magnetic member is used to drive a wheel assembly by way of an electric motor thereby driving the vehicle. In certain embodiments, the piston is caused to reciprocate linearly by a pair of combustion chambers which operate in an alternating fashion thereby causing current to be output via the coil. The invention allows for a highly flexible vehicle design which results in improved fuel efficiency, increased power, less weight, and improved travel ranges in an electrically powered vehicle.

12 Claims, 6 Drawing Sheets

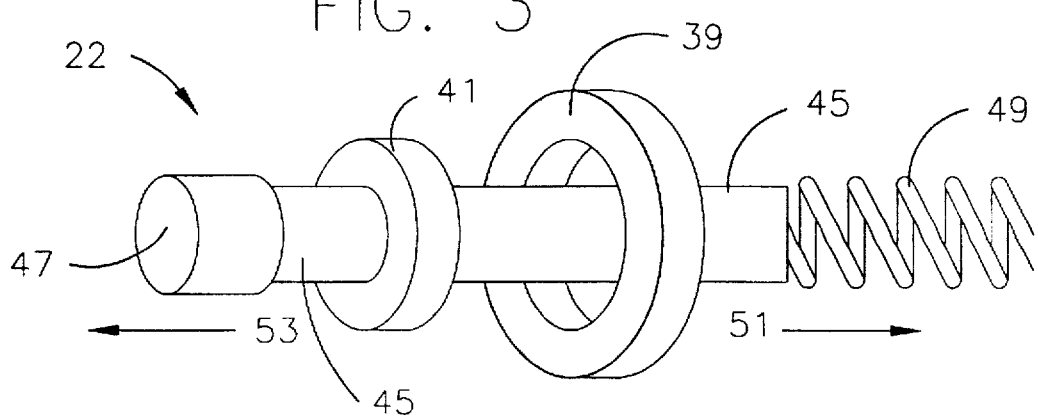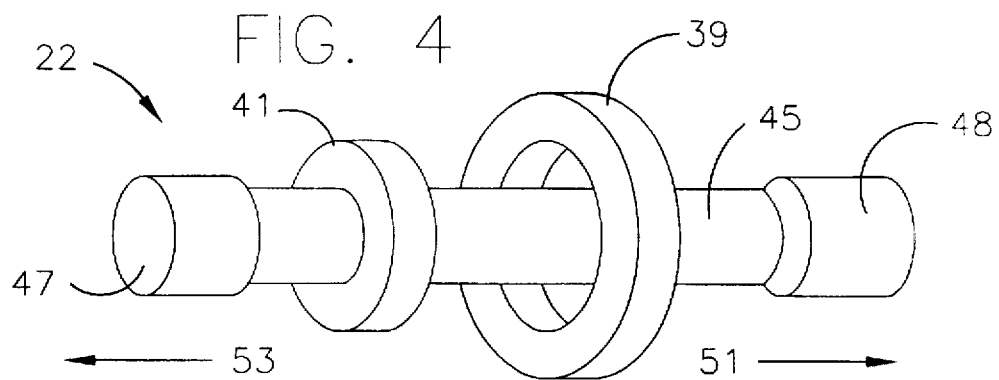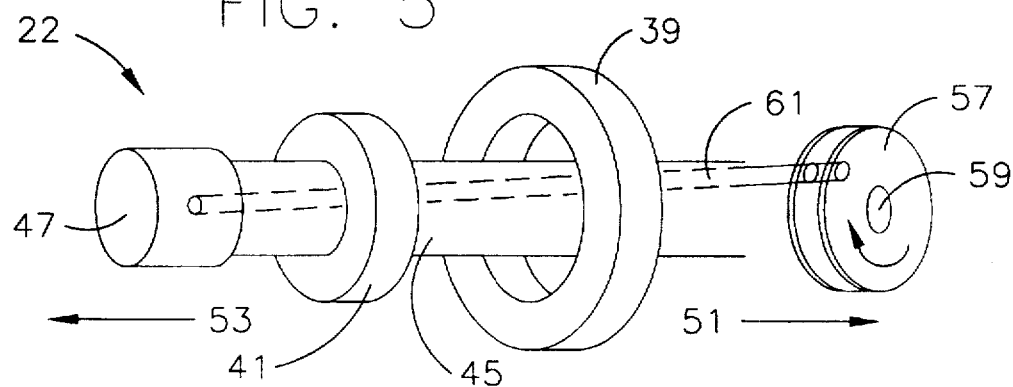

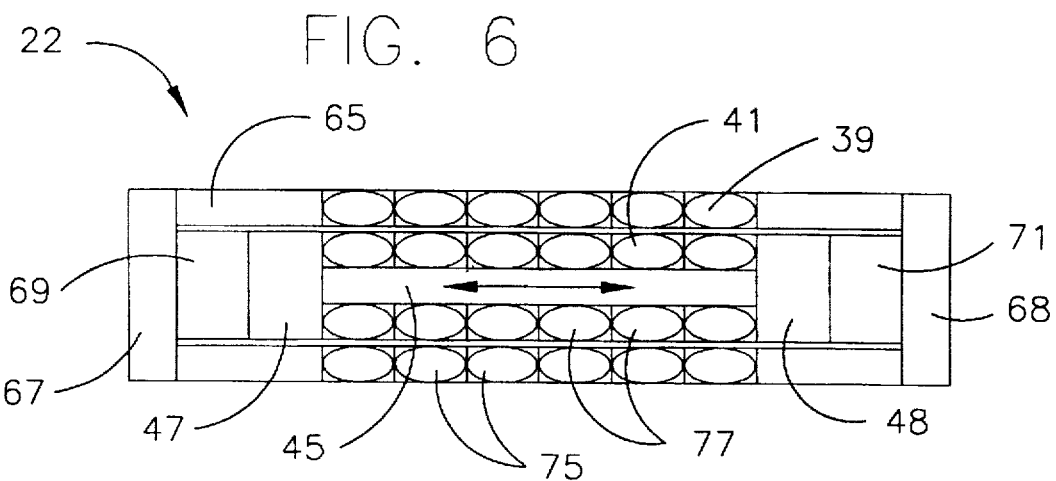
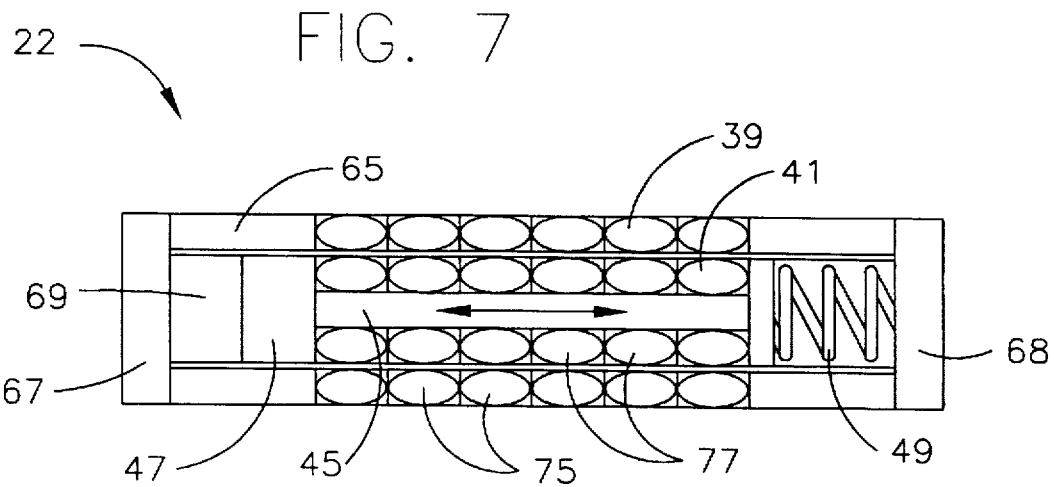

5,788,003

ELECTRICALLY POWERED MOTOR VEHICLE WITH LINEAR ELECTRIC GENERATOR

This invention relates to an electrically powered vehicle. More particularly, this invention relates to an electrically powered vehicle including an electromagnetic linearly reciprocating generator for driving an electric motor which in turn drives the vehicle thereby resulting in improved fuel efficiency.

BACKGROUND OF THE INVENTION

Currently, nearly all motor vehicles (e.g. automobiles) depend upon internal combustion (IC) engines as their source of power. This, of course, results in (i) an unstable and expensive supply of fuel; and (ii) air pollution. The former problem translates into undesirably high vehicle operating costs, while the latter problem both harms the environment and causes ever-growing restrictions on internal combustion engines which in turn force the industry to research technology relating to electrically driven cars or other vehicles.

Electrically powered land vehicles are old and well known throughout the art. See, for example, U.S. Pat. Nos. 4,350,219; 5,004,061; 5,343,971; 5,343974; and 5,460,234. The '219 patent, for example, discloses a vehicle driven by a battery which powers an electric motor in order to drive the vehicle. The voltage applied to the main driving motor from the battery is proportional to the speed at which the vehicle is driven. Unfortunately, electric vehicles driven solely by batteries such as that disclosed in the '219 patent have limited travel ranges in view of the fact that the battery or batteries must be recharged or replaced after a certain amount of time.

The vehicle of U.S. Pat. No. 5,460,234 suffers from a similar problem as the vehicle is driven by a plurality of batteries and a control unit supported by the vehicle body. Additionally, such vehicles are typically not powerful enough in view of the fact that the power output by the battery(ies) is limited and must be properly allocated.

It will be apparent to those of skill in the art from the above that there exists a need in the art for an electrically powered vehicle which has an extended travel range and does not rely solely on battery power to be driven.

In response to this need, vehicles such as that disclosed in U.S. Pat. No. 5,343,971 have been developed which utilize an internal combustion engine to generate electric current in order to drive an electromotor and thus the vehicle. The vehicle of the '971 patent includes an internal combustion engine having a generator for producing current which is rectified and fed to the electromotor. A plurality of such electromotors are provided, each for driving a particular wheel assembly.

Unfortunately, systems for electric vehicles such as that disclosed in the '971 patent have not to date appreciated the inefficiencies associated with their methods and systems for generating electric power for driving on-board electromotors. Many such generators utilize an armature or stator coil and a field coil which move past one another in a parallel manner. For example, prior art FIG. 8(b) illustrates chemical energy 80 being utilized to cause engine cylinder firing 81 so as to drive a piston at 82. The engine's rotary output at 83 is input to a generator at 84 which moves coils past coils in a lateral manner at 85 so as to generate electrical energy 86. Such generators are inefficient, especially when combined with IC engines which typically use linear force. It has been found that magnetic fields inside circular coils are more intense than fields used in such lateral devices. Furthermore, such generators typically do not efficiently utilize the linear nature of a combustion engine to its advantage in order to generate electricity (i.e. current or voltage) for the electromotor(s). Much energy is wasted in prior art engines in translating the linear motion of such engines into rotary and/or lateral motion or power.

In view of the above, it will be apparent to those of skill in the art that there exists a need in the art for an electrically driven vehicle including an internal combustion or IC engine which utilizes efficient linearly reciprocating motion for producing electric power for driving the corresponding electric motor(s). In such a manner, the vehicle can be provided with increased power, improved fuel efficiency, reduced complexity, less weight, etc.

SUMMARY OF THE INVENTION

Generally speaking, this invention fulfills the above-described needs in the art by providing an electrically powered motor vehicle comprising:

an electric drive motor for driving at least one wheel assembly mounted on an axle;

internal combustion linear reciprocating piston means for generating electricity to drive the motor, the linear reciprocating piston means including a linear reciprocating coil disposed within an annular magnet means so that repetitive linear reciprocating movement of the coil inside of the annular magnet means caused by internal combustion leads to electricity being generated in the coil which is output to the motor for driving same; and wherein the reciprocating piston means includes a piston device driven by internal combustion and affixed to the coil so that when the engine drives the piston in a linear fashion, electricity is generated by the coil and output from the coil toward the electric drive motor.

This invention will now be described with respect to certain embodiments thereof, accompanied by certain illustrations wherein:

BRIEF DESCRIPTION OF THE DRAWINGS

FIG. 3 is a side elevational view illustrating the electromagnetic piston-like generator of FIGS. 1–2 according to a first embodiment of this invention.

FIG. 4 is a side elevational view illustrating the electromagnetic piston-like generator of FIGS. 1–2 according to a second embodiment of this invention.

FIG. 5 is a side elevational view illustrating the electromagnetic piston-like generator of FIGS. 1–2 according to a third embodiment of this invention.

FIG. 6 is a side cross-sectional view of a piston assembly in the IC engine generator according to the FIG. 4 embodiment.

FIG. 7 is a side cross sectional view of a piston assembly in the IC engine generator according to the FIG. 3 embodiment.

DETAILED DESCRIPTION OF CERTAIN EMBODIMENTS OF THIS INVENTION

Figure 1:
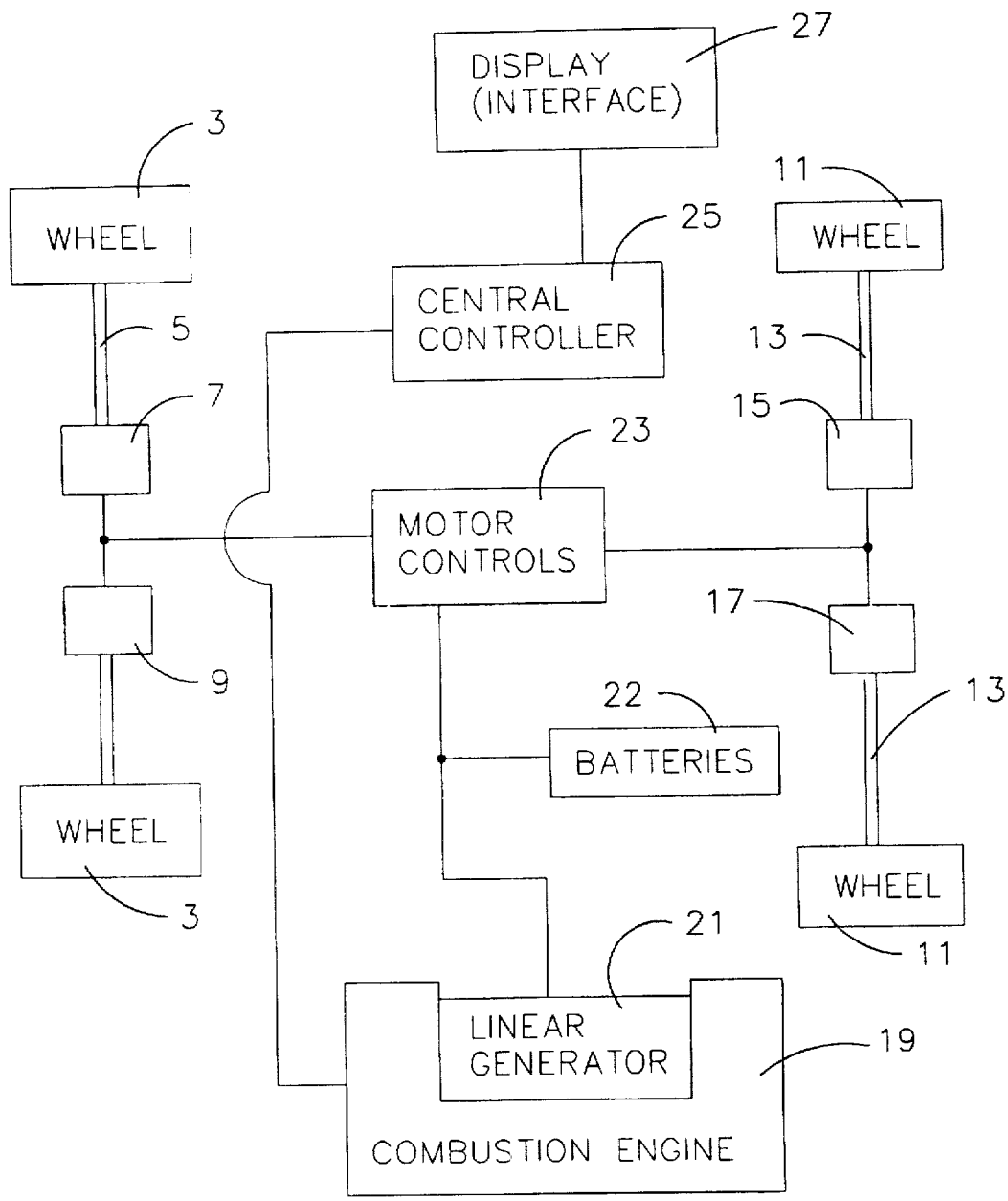
FIG. 1 is a block diagram illustrating an electrically driven motor vehicle according to an embodiment of this invention.

Referring now more particularly to the accompanying drawings wherein like reference numeral indicate like parts throughout the several views.

FIG. 1 is a block diagram illustrating an electrically powered motor vehicle according to an embodiment of this invention. The vehicle includes rear wheel assemblies 3 mounted on supporting rear axle assemblies 5, alternating current driven (AC) motors 7 and 9 for driving rear wheels 3, front wheel assemblies 11 mounted on supporting front axle assemblies 13, AC motors 15 and 17 for driving front wheels 11, internal combustion (IC) engine 19 (two cycle or four cycle) including electric power linear generator 21, battery or batteries 22, motor control(s) 23, central controller 25, and dashboard display 27. Engine 19 may be fuel injected with or without an oil lubrication system as will be appreciated from the invention set forth below.

The central component of the vehicle is internal combustion (IC) engine 19 which includes generator 21 and battery 22. Generator 21, described below in detail, utilizes repetitive linear reciprocating movement of an electromagnetic piston assembly in order to generate electric power which is supplied to motor control(s) 23. In such a manner, generator 21 of engine 19 takes advantage of the linear nature of the IC engine so as to provide an efficient source of electric power and improve fuel efficiency. Battery 22 may be used for example to power auxiliary devices while linear engine 19 and thus generator 21 may be started by reversing the current in the coils.

After electric power (e.g. alternating current) is output from generator 21 as driven by IC engine 19, the power is supplied to motor control 23 which receives its instructions from central controller 25. For instance, according to certain embodiments of this invention, controller 25 instructs control 23 how much power to allocate each AC motor (7, 9, 15, and 17) thereby dictating the number of wheels driven and the speed of the vehicle. The number of motors 7, 9, 15, and 17 utilized and powered is a function of whether the vehicle is of the two wheel or four wheel drive type. The speed at which the vehicle is driven may be a function of the electric power supplied by generator 21 (and/or a storage capacitor) to selective motors 7, 9, 15, and 17.

The driver of the vehicle interacts with display 27 which is located inside the passenger compartment. Display 27 alerts the driver as to, for example, the output of IC engine 19, the power (e.g. current) being generated by generator 21, the speed of the vehicle, the amount of extra electric power currently being stored in the vehicle by way of battery 22 or a storage capacitor, and/or the amount of power being supplied to each motor 7, 9, 15, and 17 at a given time. The driver or user is able to manipulate vehicular behavior (e.g. speed) from within the passenger compartment by way of interaction with central controller 25 which in turn controls IC engine 19, generator 21, and control 23. For example, the driver may cause controller 25 to instruct IC engine 19 to drive at a higher rate thereby causing generator 21 to generate more power for the wheel motors and/or the storage capacitor. As another example, the driver may cause controller 25 to allocate specific amounts of electric power being generated by generator 21 in different amounts to each or one of the wheel drive motors 7, 9, 15, and 17.

Figure 2:
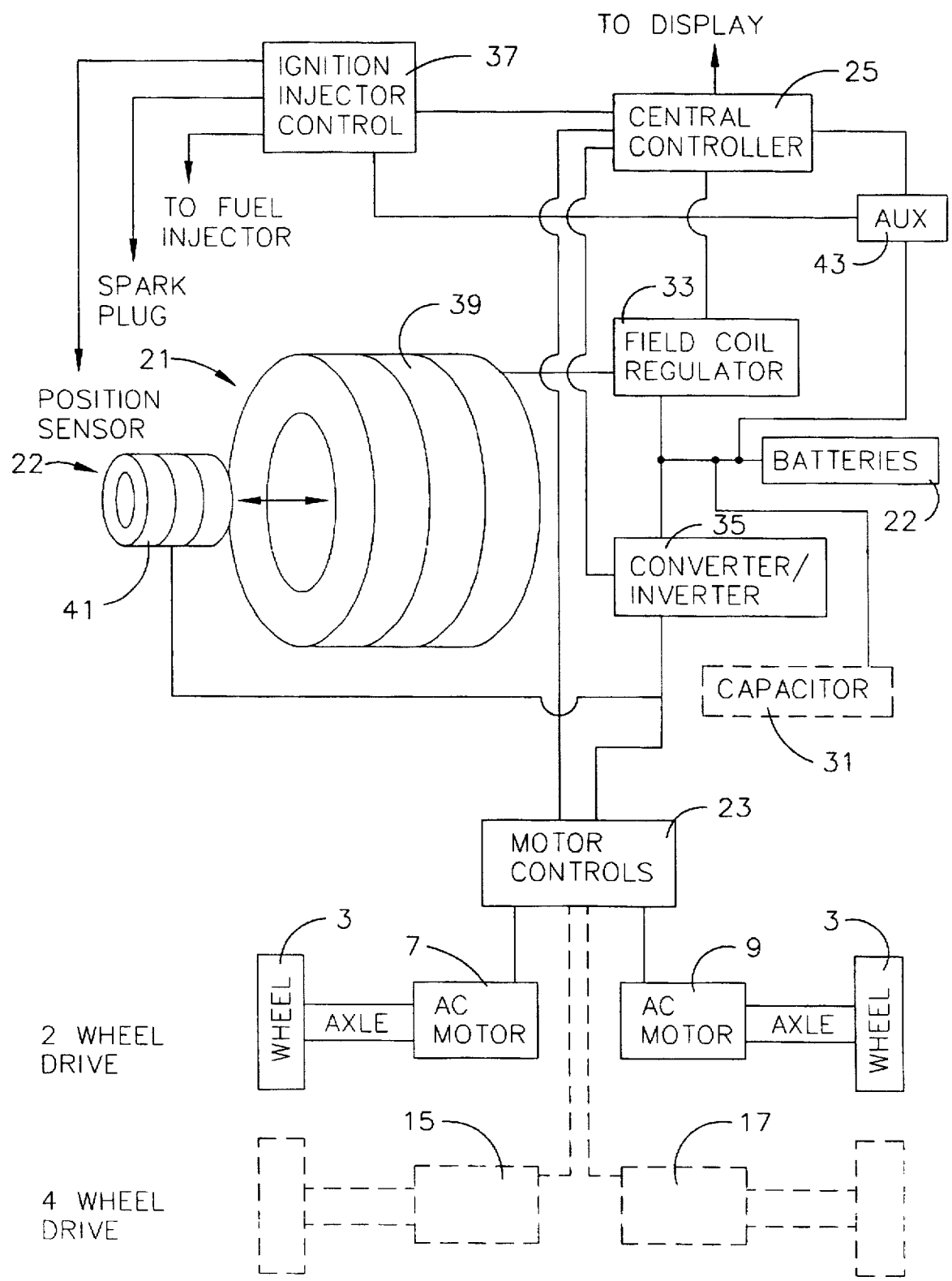
FIG. 2 is a schematic diagram illustrating an electromagnetic linearly reciprocating generator within the IC motor of FIG. 1, this generator supplying power for driving the vehicle.

FIG. 2 is a schematic diagram illustrating generator 21 and piston assembly 22 thereof, motor control 23, storage capacitor 31, regulator 33, DC converter/inverter 35, auxiliary device 43 (e.g. air conditioner), ignition injector control 37 connected to the spark plugs, fuel injector, and position sensor, (see FIG. 9) and AC motors 7 and 9. In four wheel drive applications, electrically driven motors 15 and 17 are provided for powering additional wheels. As shown, piston assembly 22, within IC engine 19 and generator 21, includes stationary magnet means or magnetic field coil 39 and linearly reciprocating charge or stator coil 41. Coil 41 is caused to linearly reciprocated inside of coil 39 thereby causing electric power (e.g. current) to be generated in coil 41 and output to control 23 and/or converter/inverter 35. According to certain embodiments, both coils 39 and 41 are annular in design (although other shapes such as rectangular, triangular, or oval may be utilized) so that coil 41, during its reciprocating linear motion, moves inside of and out of larger coil 39 and its magnetic field in a repetitive manner. In other words, the moving of coil 41 through coil 39 causes electric power to be generated from coil 41.

The current from coil 41 as set forth above may be forwarded from generator 21 to motor control 23, and from there to, for example; one of or both of AC motors 7 and 9 so as to drive wheel assemblies 3. Alternatively, the power generated by generator 21 may be (i) used to drive auxiliary device 43 (e.g. heater); (ii) stored in capacitor 31 for later use; (iii) used to power display 27; and/or (iv) used to recharge battery(ies) 22. Auxiliary devices 43 which may be driven by the power created in generator 21 include water pumps, air conditioners, lubrication system components, etc. Meanwhile, control 37 is utilized to operate and manipulate the fuel injector for engine 19, the spark plug(s), and/or position sensors.

FIG. 3 is a side elevational view of electromagnetic piston assembly 22 according to a first embodiment of this invention. As shown, electromagnetic piston assembly 22 includes inner coil 41, outer field coil 39, piston rod 45, biasing spring 49, and rod cap 47. Inner annular coil 41 is affixed to piston rod 45 around the outer periphery thereof so that coil 41 moves linearly back and forth within coil 39 along with rod 45. The linear reciprocating movement of rod 45 and coil 41 is caused by combustion adjacent cap 47 which works in combination with spring 49 to move rod 45 and coil 41 back and forth linearly inside of stationary coil 39. Combustion adjacent the outer side of piston rod cap 47 (see FIGS. 6–7 and 9) causes rod 45 and thus coil 41 to move in direction 51. Following this combustion (created in a known manner by IC engine 19), spring 49 biases rod 45 and coil 41 back toward the combustion chamber in direction 53. In such a manner, spring 49 and the aforesaid combustion adjacent cap 47 work in alternating combination to drive coil 41 back and forth linearly within the magnetic field created by coil 39. As conductive coil 41 moves in such a manner, it generates electricity as shown in FIG. 2 which may be forwarded to the electric motors for driving the wheel assemblies (i.e. as a conductor moves through a magnetic field, current is produced). Thus, electric power is generated without the need for rotary movement and similar components within engine 19 and generator 21. The result, for example, may be that when IC engine 19 is run at a known or given speed, about 60 Hertz may be generated.

Any number of piston assemblies 22 may be utilized depending upon the particular application to which the system is applied, with each piston cylinder being tuned to a particular speed so as to maximize fuel efficiency. According to alternative embodiments of this invention, other known chemical reaction(s) may be utilized in the chamber adjacent cap 47 so as to cause rod 45 to move linearly as described above. Additionally, field coil 39 may be positioned inside of generating coil 41 according to alternative embodiments.

FIG. 4 is a side elevational view of electromagnetic piston assembly 22 according to a second embodiment of this invention. This FIG. 4 embodiment differs from the FIG. 3 embodiment in that cap 48 is provided at one end of rod 45 and cap 47 at the other end. IC created by engine 19 adjacent each cap 47 and 48 in an alternating order causes rod 45 and inner coil 41 to linearly reciprocate back and forth within the field of outer coil 39 so that current is produced from coil 41 as shown in FIG. 2. Thus, caps 47 and 48 function so that IC in the adjacent combustion chamber (see FIGS. 6–7 and 9) is translated into linear movement of rod 45. For example, combustion occurs adjacent cap 47 which causes rod 45 and coil 41 to move in direction 51. Then, after this initial combustion, combustion adjacent cap 48 is created by the IC engine which causes rod 45 and coil 41 to move back in direction 53, and so forth thereby generating electric power until engine 19 is stopped.

FIG. 5 is a side elevational view of electromagnetic piston assembly 22 in generator 21 according to a third embodiment of this invention. This FIG. 5 embodiment differs from the first and second embodiments in that rotary member 57, rotating shaft 59, and reciprocating elongated rod 61 are provided for linearly reciprocating rod 45 and stator coil 41. The driving (i.e. rotating) of shaft 59 causes member 57 to rotate which in turn causes elongated rod 61 (affixed to rod 45 by way of cap 47) to linearly reciprocate rod 45 within coil 39. As rod 61 is interiorly and pivotally connected to rod 45 at the end near cap 47, rotary movement of member 57 is translated into linear reciprocating movement of rod 45 and coil 41 in order to generate electric power.

With respect to alternative FIG. 5 embodiments, combustion may be used adjacent cap 47 to move rod 45 while assembly 57, 61 biases rod 45 back toward the combustion chamber. Alternatively, a cam may be used in conjunction with a rotating shaft to cause shaft 61 and thus rod 45 to linearly reciprocate.

FIG. 6 is a side cross sectional view of the FIG. 4 embodiment illustrating combustion chambers in IC engine 19 provided at each end of rod 45. As shown, combustion chamber 69 is provided adjacent cap 47 while combustion chamber 71 is provided adjacent cap 48 so that alternating combustion in chambers 69 and 71 drives rod 45 in a reciprocating manner within the piston assembly. Electromagnetic piston assembly 22 as shown in FIG. 6 includes annular stationary casing or housing 65 for supporting the coils, chambers, and rod, as well as housing closures 67 and 68. Housing closure 67 helps define chamber 69 adjacent cap 47 while closure 68 helps define combustion chamber 71 adjacent cap 48.

According to the FIG. 6 embodiment, outer coil 39 is made up of a plurality of windings 75 for creating a magnetic field while inner or stator coil 41 is made up of a plurality of conductive windings 77 affixed to and surrounding rod portion 45. The outer diameter of windings 77 is substantially equal to that of caps 47 and 48 while the diameters of windings 75 are substantially flush with housing 65 providing for an efficient design. Coils 39 and 41 as shown have substantially equal lengths along rod 45.

FIG. 7 is a side cross sectional view of the electromagnetic piston assembly 22 of the FIG. 3 embodiment including biasing spring 49. In a manner similar to the FIG. 6 embodiment, coils 39 and 41 are supported by housing 65. Combustion chamber 69 is provided at one end of rod 45 and spring 49 at the other so that IC within chamber 69 causes rod 45 and coil 41 to reciprocate back and forth within the housing thereby causing coil 41 to generate electric power as it moves through the magnetic field created by coil 39.

Figure 8A:
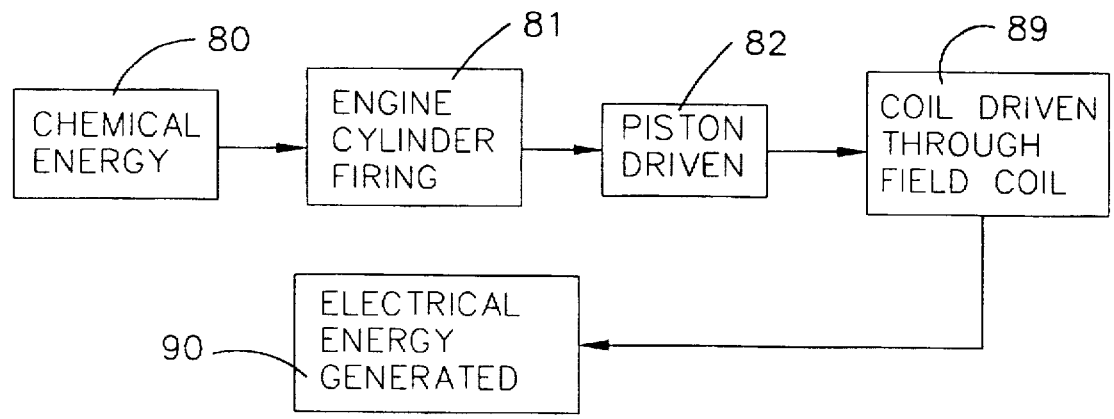
FIG. 8(a) is a block diagram/flowchart of the system according to an embodiment of this invention.
Figure 8B:
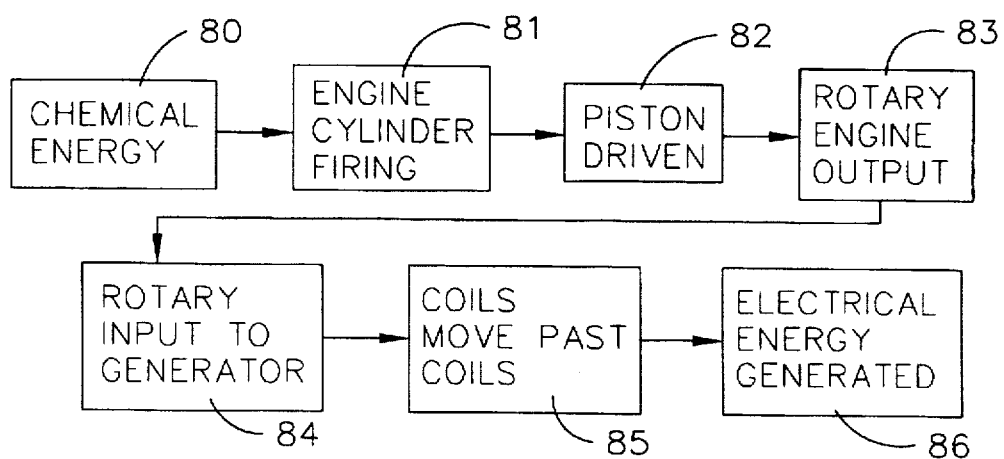
FIG. 8(b) is a prior art block diagram/flowchart of a prior art system to be compared with FIG. 8(a).

FIG. 8(a) is a block diagram/flowchart of a system according to this invention. As shown, chemical energy 80 is used to cause cylinder firing 81 within a combustion chamber so that piston rod 45 in assembly 22 may be driven at 87. When rod 45 is linearly reciprocated in step 87, coil 41 is caused to move back and forth through field coil 39 in step 89 which results in electrical energy being generated at 90.

According to still further embodiments, the power generated from the generator could be used to recharge a battery in a conventional electric car where the battery supplies the power to the electromotor(s).

Figure 9:
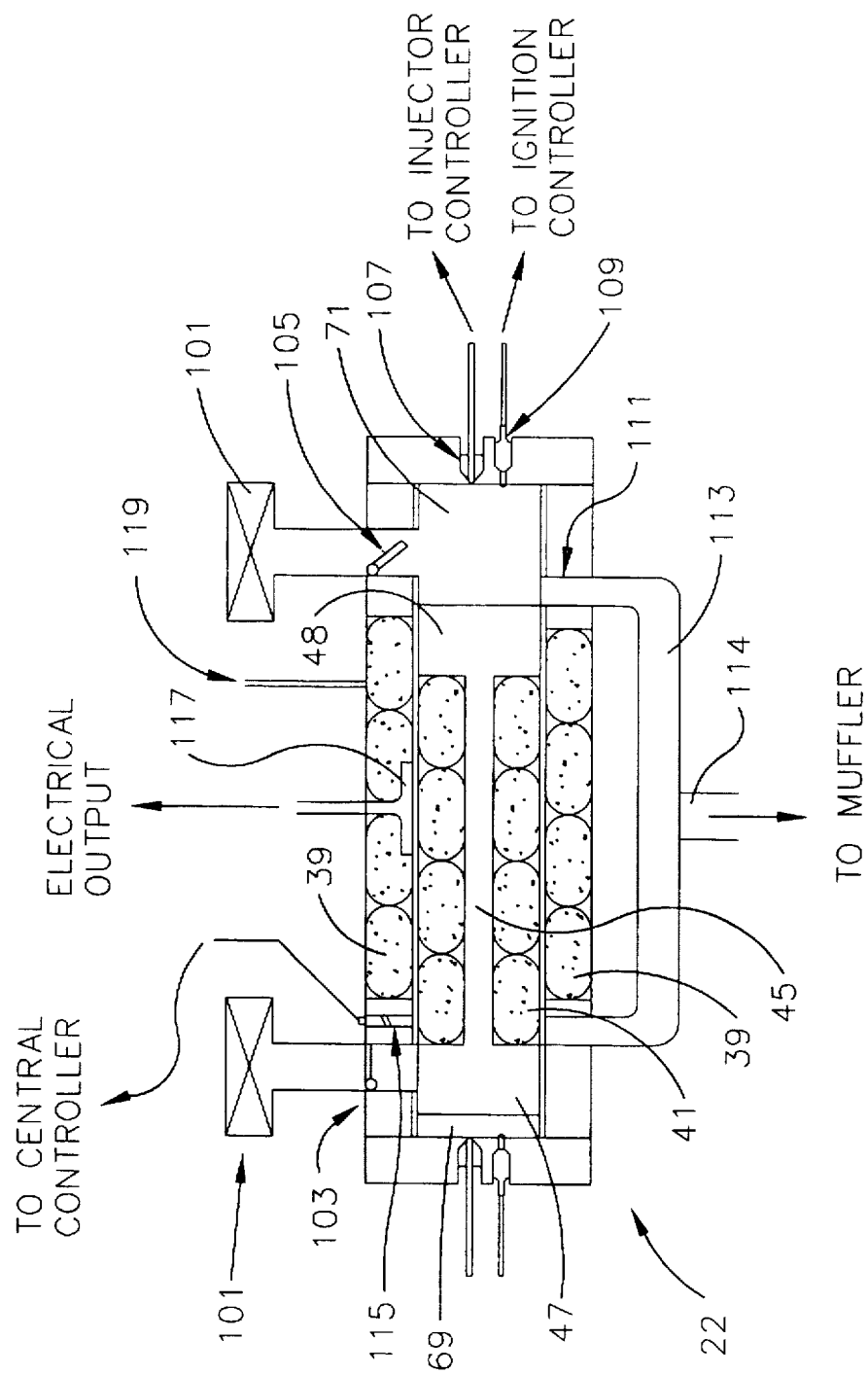
FIG. 9 is a side elevational, partial cross-sectional view, of the piston assembly in an automotive application.

FIG. 9 is a side elevational, partial cross-sectional view, of a cylinder including a piston assembly for generating electricity according to an automotive embodiment of this invention. As shown, the system includes inner coil 41 attached to piston rod 45, outer stationary field coil 39, combustion chambers 69 and 71 on opposing sides of rod 45, caps 47 and 48, air breathers 101, intake valve 103, intake valve 105, fuel injector 107, spark plug 109, exhaust port 111, exhaust manifold 113 including output 114 to the muffler (not shown), position sensor 115, and commuter 117. As shown, intake valve 103 associated with chamber 69 is in the closed position while intake valve 105 associated with chamber 71 is in the open position. This, of course, changes through repetitive reciprocation of piston 45 and coil 41 within the cylinder. Input 119 to field coils 39 permit same to generate a magnetic field so that electric power is generated by the reciprocation of piston rod 45 and coil 41 within coil(s) 39. According to certain embodiments of this invention, the field created by the field coils may be manipulated in order to decelerate piston 45 at the end of respective strokes.

The FIG. 9 embodiment is similar to the FIG. 4 embodiment in that combustion chambers 69 and 71 operate in an alternating manner so as to linearly reciprocate a piston assembly. Fuel injectors 107 input appropriate fuel into chambers 69 and 71 so that combustion may occur.

Once given the above disclosure, therefore, various other modification, features, or improvements will become apparent to the skilled artisan. Such other features, modifications, and improvements are thus considered a part of this invention, the scope of which is to be determined by the following claims.

I claim:

1. An electrically powered motor vehicle comprising:
   an electric drive motor for driving at least one wheel assembly mounted on an axle;
   internal combustion linear reciprocating piston means for generating electricity to drive said motor, said linear reciprocating piston means including a linear reciprocating conductive coil disposed within an annular magnet means so that repetitive linear reciprocating movement of said coil inside of said annular magnet means caused by internal combustion leads to electricity being generated in said coil which is output to said electric drive motor for driving same; and
   wherein said reciprocating piston means includes a piston device driven by direct firing internal combustion chambers and affixed to said coil so that when the engine drives the piston in a linear fashion electricity is generated by said coil and output from said coil toward said electric drive motor.

2. The motor vehicle of claim 1, further comprising at least one battery for storing and supplying electric power.

3. The motor vehicle of claim 1, wherein said coil is annular in shape and is affixed around the exterior of said piston so that linear reciprocation of the piston through the magnet means causes said coil to linearly reciprocate through the magnet means and generate electricity.

4. The motor vehicle of claim 1, wherein said coil and said magnet means are both elongated and annular in design.

5. The motor vehicle of claim 1, further comprising first and second electric motors for driving first and second wheel assemblies respectively, said first and second electric motors being powered by the electricity generated by said coil due to the linear reciprocating motion.

6. The vehicle of claim 1, wherein said magnet means includes one of a permanent annular magnet and an annular field coil.

7. An electrically powered motor vehicle comprising:

an electric drive motor for driving at least one wheel assembly mounted on an axle;

internal combustion linear reciprocating piston means for generating electricity to drive said motor, said linear reciprocating piston means including a linear reciprocating conductive coil disposed within an annular magnet means so that repetitive linear reciprocating movement of said coil inside of said annular magnet means caused by internal combustion leads to electricity being generated in said coil which is output to said electric drive motor for driving same;

wherein said reciprocating piston means includes a piston device driven by internal combustion and affixed to said coil so that when the engine drives the piston in a linear fashion electricity is generated by said coil and output from said coil toward said electric drive motor; and wherein said piston is powered and caused to linearly reciprocate by combustion taking place in both a first combustion chamber proximate a first end of said piston and a second combustion chamber proximate a second end of said piston, the combustion in said first and second chambers being caused in an alternating order by way of fuel injection.

8. An electrically powered motor vehicle comprising:

an electric drive motor for driving at least one wheel assembly mounted on an axle;

internal combustion linear reciprocating piston means for generating electricity to drive said motor, said linear reciprocating piston means including a linear reciprocating conductive coil disposed within an annular magnet means so that repetitive linear reciprocating movement of said coil inside of said annular magnet means caused by internal combustion leads to electricity being generated in said coil which is output to said electric drive motor for driving same;

wherein said reciprocating piston means includes a piston device driven by internal combustion and affixed to said coil so that when the engine drives the piston in a linear fashion electricity is generated by said coil and output from said coil toward said electric drive motor; and a spring in a chamber located at an end of said piston, said spring for working in conjunction with internal combustion in a combustion chamber at the other end of the piston in order to linearly reciprocate the piston and generate electricity.

9. An electrically powered motor vehicle comprising:

a wheel assembly;

an axel assembly for supporting said wheel assembly;

an electric drive motor for driving said wheel assembly thereby causing the motor vehicle to move; and an internal combustion engine including an electromagnetic linearly reciprocating piston assembly for generating electric power for powering said electric drive motor, said piston assembly including an elongated piston member which is caused by direct firing internal combustion chambers to linearly reciprocate in a repetitive manner inside of a magnetic annular member so as to cause the piston assembly to generate the electric power for powering said drive motor.

10. The vehicle of claim 9 further comprising a coil mounted on said piston member so that the reciprocating motion of the piston and said coil within the magnetic annular member causes said coil to generate the electric power.

11. The vehicle of claim 9 wherein said magnetic annular member includes one of a permanent annular magnet and an electromagnetic coil.

12. An electrically powered motor vehicle comprising:

a wheel assembly;

an axle assembly for supporting said wheel assembly;

an electric drive motor for driving said wheel assembly thereby causing the motor vehicle to move;

an internal combustion engine including an electromagnetic linearly reciprocating piston assembly for generating electric power for powering said electric drive motor, said piston assembly including an elongated piston member which is caused by internal combustion to linearly reciprocate in a repetitive manner inside of a magnetic annular member so as to cause the piston assembly to generate the electric power for powering said drive motor;

wherein said engine further comprises a first combustion chamber located proximate a first end of said elongated piston member for causing the reciprocating motion of said piston; and a second combustion chamber located proximate a second end of said piston member for working in conjunction with said first combustion chamber for linearly reciprocating said piston within said magnetic annular member as combustion in said first and second chambers is caused in an alternating order so as to reciprocate the piston linearly.

* * * * *